April 9, 1968 R. L. McMILLEN 3,377,283
PROCESS FOR PREPARING THICKENED COMPOSITIONS
Filed March 9, 1967

INVENTOR
RICHARD L. McMILLEN
BY James W. Adams, Jr.
AGENT

United States Patent Office 3,377,283
Patented Apr. 9, 1968

3,377,283
PROCESS FOR PREPARING THICKENED COMPOSITIONS
Richard L. McMillen, Painesville, Ohio, assignor to The Lubrizol Corporation, Wickliffe, Ohio, a corporation of Ohio
Continuation-in-part of application Ser. No. 369,271, May 21, 1964. This application Mar. 9, 1967, Ser. No. 621,825
15 Claims. (Cl. 252—33)

ABSTRACT OF THE DISCLOSURE

A process subject to continuous operation which comprises passing an alkali or alkaline earth metal overbased organic material in admixture with a conversion agent through an elongated heating tube at a temperature within the range of about 90°–320° C. and a pressure in excess of one atmosphere which is sufficient to maintain the admixture in the liquid state. Oil solutions of carbonated basic alkaline earth metal salts or complexes of petrosulfonic acids are typical overbased organic materials while water, carboxylic acids, and alcohols are among the suitable conversion agents. The products are non-Newtonian colloidial disperse systems which are useful as lubricants, and additives for lubricants, resins, coating compositions, and the like.

Figure 1:
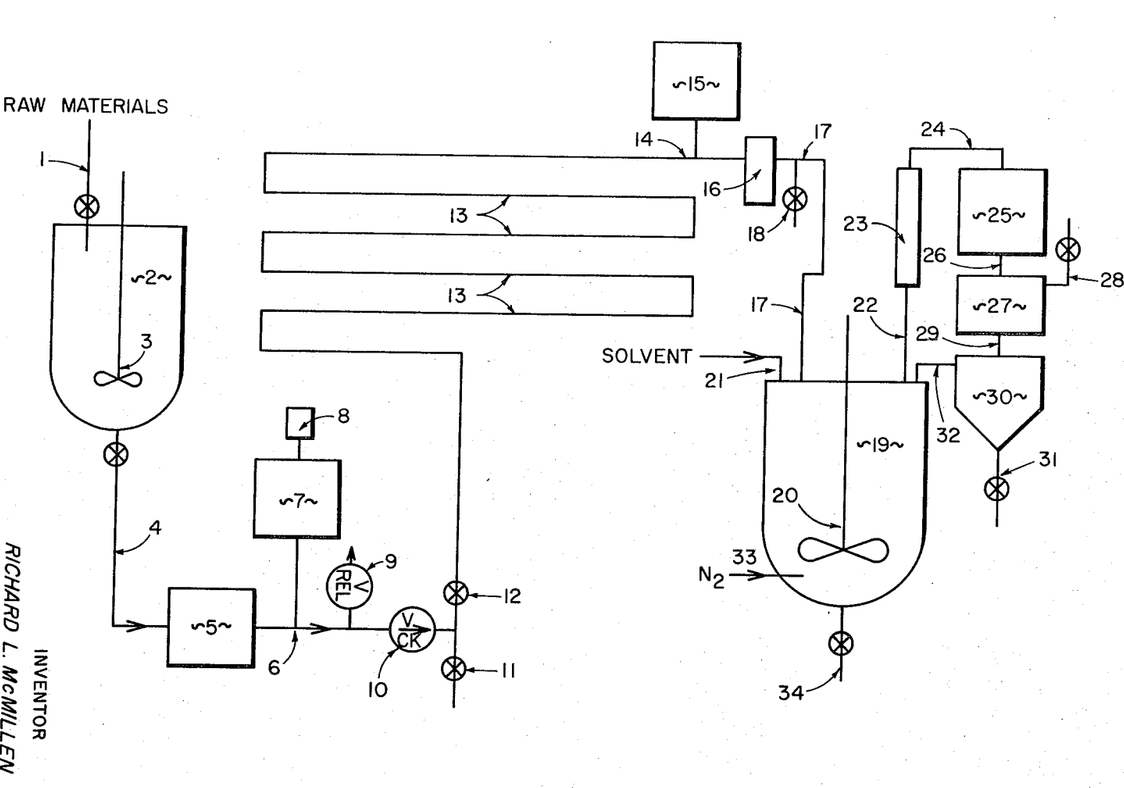

This application is a continuation-in-part of copending application Ser. No. 369,271 filed May 21, 1964, now abandoned.

This invention relates to an improved process for preparing colloidal disperse systems. In a more particular sense it relates to an improved process for preparing non-Newtonian colloidal disperse systems which are characterized by a high degree of basicity and are useful as lubricants and as additives in lubricants, asphalts, fuels, cutting oils, caulking compounds, polymeric compositions, corrosion preventing coatings, etc.

In earlier filed application Ser. No. 185,521, filed Apr. 6, 1962, now Patent No. 3,242,079, applicant described the manufacture of these grease-like colloidal disperse systems by the process of homogenizing an oil soluble solution of an overbased organic material (i.e., a carbonated alkaline earth metal salt of an oil-soluble acid) having a metal ratio of at least about 4.5 with, as the conversion agent, an active hydrogen compound selected from the class consisting of lower aliphatic carboxylic acids, water, and water-alcohol mixtures at a temperature of between 25° C. and the reflux temperature of the mixture. In subequent applications, such as Ser. No. 309,293 filed Sept. 16, 1963, Ser. No. 323,135 filed Nov. 12, 1963, Ser. No. 535,048 filed Mar. 17, 1966, Ser. No. 535,742 filed Mar. 21, 1966, Ser. No. 535,693 filed Mar. 21, 1966, Ser. No. 580,575 filed Sept. 20, 1966. Ser. No. 612,332 filed Jan. 30, 1967.

Basically, these processes, as described in these earlier filed applications, are carried out by vigorously stirring the mixture of ingredients, i.e., the overbased organic material and the conversion agent, while heating for a sufficient time to effect conversion to the colloidal disperse systems. Mechanical agitation of the mass becomes increasingly difficult as the conversion process progresses since the resulting colloidal disperse system is more viscous than the initial mixture of ingredients. In order to obtain good mixing and to prevent the build-up of the thickened material on the walls of the vessel, it is usually necessary to employ an agitator having scraper blades which closely follow the walls of the vessel. Stirring of this nature requires the use of a powerful motor to drive the agitator. It is not uncommon to find that the agitator and the 1000 gallon kettle must be driven by a twenty horsepower motor.

It has been found that the conversion process can be performed with a great saving in time, power, and expensive equipment by passing the mixture of ingredients in the proper proportions through an elongated heating zone under sufficient pressure to maintain the mixture in a liquid state while heating it to a temperature within the range of from about 90° C., to about 320° C., and below the decomposition temperature of the least stable component in the mixture.

Accordingly, it is an object of this invention to provide an improved process for preparing non-Newtonian colloidal disperse systems.

It is also an object of this invention to provide an improved process for the preparation of non-Newtonian colloidal disperse systems the process being capable of continuous operation.

It is a further object of this invention to provide improved process for preparing a non-Newtonian colloidal disperse system useful as lubricants and as additives for lubricants, polymeric compositions, fuels, drawing compounds, and the like.

These and other objects of the invention are attained in accordance with this invention by providing a process for converting a member selected from the class consisting of alkali and alkaline earth metal overbased organic materials having a metal ratio of at least about 3.5, said material comprising at least about 30% by weight of non-metal containing liquid medium, into a non-Newtonian colloidal disperse system comprising passing a mixture of (1) at least one said overbased organic material and (2) from about 1% to about 80% by weight based on the weight of said overbased organic material excluding the weight of the liquid medium of a conversion agent selected from the class consisting of water, lower aliphatic carboxylic acids, aliphatic alcohols, cycloaliphatic alcohols, arylaliphatic alcohols, phenols, ketones, aldehydes, amines, boron acids, and phosphoric acids, through an elongated heating zone under a pressure above one atmosphere and sufficient to maintain the mixture in the liquid state at a temperature within the range of from about 90° C. to about 320° C. at such a rate that an increment of said mixture is in the heating zone for a sufficient time to permit conversion to take place.

Referring now to the drawing, a diagrammatic representation of a typical system which may be employed in the practice of this invention, raw materials consisting of an overbased organic material and a conversion agent are introduced, in the proper proportions, through line 1 into the mixing tank 2 which is equipped with a stirrer means 3. Inert ingredients may also be introduced into the conversion mixture. Said inert ingredients may include inert liquids, particularly solvents for the overbased organic material such as a hydrocarbon solvent (e.g., a low boiling petroleum naphtha) and/or a bodying agent such as a polystyrene or other resin to modify the characteristics of the finished product. Preferably the resins will be soluble in the conversion mixture.

After thorough mixing is accomplished in tank 2, the conversion mixture is passed through valved line 4 to the high pressure pump 5, and then through line 6, check valve 10, and vale 12 to the elongated heating zone 13. Line 6 is also connected through a surge tank 7 to a pressure switch 8 which is set to cut off the pump motor at a pre-determined maximum pressure. Line 6, as a safety measure, is also connected to a pressure relief valve 9.

The mixture, while passing through the elongated heating zone 13, is heated to the desired temperature and is held at that temperature for a sufficient period of time to permit gelling of the product to take place. The mixture within the heating zone 13 is maintained under sufficient pressure to keep the volatile components in the liquid state by the high pressure pump 5 which is regulated by the pressure switch 8 and the back pressure regulator 16.

The product from the heated zone 13 passes through line 14, equipped with a surge tank 15, to the back pressure regulator 16 and then through valved line 17 to the receiver tank 19. Alternatively, the product may be drawn off through valve 18. Provision is made to heat line 14, surge tank 15, back-pressure regulator 16 and line 17 by steam jacketing.

Upon passing from the high pressure side to the low pressure side of the pressure regulator 16, much of the conversion agent, if volatile, and volatile inert solvents, if used, are vaporized from the hot product. If further removal of the conversion agent or volatile solvents is desired, one means for accomplishing this is to pass the product into the receiver tank 19 where it may be diluted with a solvent introduced through line 21. The additional solvent, if employed, may be a low boiling petroleum fraction to reduce the viscosity of the product and aid in drying the product by azeotropic distillation. The product may also be diluted with a mineral oil or other suitable organic liquids to reduce the viscosity of the reaction product.

The conversion agent, if volatile, may be removed from the gelled product by heating it in receiver tank 19 with agitation provided by stirrer 20. Overhead vapors from receiver tank 19 are passed to column 23 via line 22 and then via line 24 to condenser 25. Condensed vapors pass from the condenser 25 through line 26 to the receiver 27 which may be vented to the atmosphere or attached to a vacuum line by means of valved line 28. The condensate passes through line 29 from the receiver 27 to a liquid phase separator 30 from which the conversion agents may be drawn off via valved line 31. If a volatile solvent, which is immiscible with the conversion agent, is used to dilute the product in the receiver tank 19 as an aid in removal of the conversion agent by azeotropic distillation, the volatile solvent may be separated in the liquid phase separator 30 and returned to the receiver tank 19 by way of valved line 32. The solvent may also be drawn off with the conversion agent through valved line 31.

Nitrogen or other inert gas may be passed through the product in receiver tank 19 via submerged line 33 in order to help free the product of the conversion agent and/or the solvent if such removal is desired. The finished product is removed from the product receiver tank 19 via valved line 34.

Preparing colloidal disperse systems by the process of this invention is effected by passing a mixture of the ingredients in the appropriate proportions through the elongated heating zone 13 under sufficient pressure to maintain all of the reactants in the liquid state. The pressure required, of course, varies with the temperature of the conversion process and the components of the conversion mixture and may range from only slightly above atmospheric pressure to several hundred pounds per square inch. The temperature at which the conversion process is carried out is preferably above about 90° C. and below about 320° C. or the decomposition temperature of the least stable component of the reaction mixture. The rate at which the conversion mixture is passed through the gelling unit is also dependent on the temperature at which the process is carried out and the residence time of the reaction mixture in the heated reaction zone may vary from several hours at low reaction temperature to as little as one minute or less at the upper temperature limit.

When preparing the non-Newtonian colloidal disperse system by passing the conversion mixtures through the heated elongated tube under pressure, it should be apparent to those skilled in the art that any solid components are not to be converted to the liquid state in the literal sense. Rather, any solid components going into the conversion mixture are either dissolved in the mixture or are mixed therewith and use the liquid portion of the mixture as a vehicle in which they are passed through the heating zone. Thus, the pressure used is intended to maintain all or substantially all of the liquid components of the conversion mixture in the liquid state.

The overbased organic materials and the conversion agents necessary for preparing the colloidal disperse systems produced by the process of this invention are discussed in detail in applicant's above-identified earlier filed applications and patent. Since the present invention involves effecting conversion of the overbased organic materials by passing the ingredients through the elongated tube under specified conditions of temperature and pressure in lieu of the previously indicated vigorous and sometimes prolonged mechanical stirring, these prior disclosures of identity, preparation, and relative amounts of overbased organic materials and conversion agents accurately describe the necessary compounds and amounts of materials which are to be the components of the mixtures to be converted to non-Newtonian colloidal disperse systems according to the present process. Thus, these earlier filed applications and patent are incorporated herein by reference. It will be understood by those skilled in the art that any of the overbased organic materials and any of the conversion agents (except oxygen, air, and carbon dioxide) can be mixed in the proportions indicated in these earlier applications and converted to a colloidal disperse system according to the process of the present application.

The earlier filed applications and the patent also disclose various uses for the non-Newtonial colloidal disperse systems and give actual examples demonstrating how they may be used such as protective coatings for metal surfaces, lubricants, and additives for polymeric compositions. Accordingly, these applications and the patent are incorporated herein by reference thereto for the benefit of their disclosures regarding the utility of the products produced by the present process.

The disperse systems, the overbased organic starting material, and the conversion agents are discussed below:

THE COLLOIDAL DISPERSE SYSTEMS

The terminology "disperse system" as used in the specification and claims is a term of art generic to colloids or colloidal solutions, e.g., "any homogeneous medium containing dispersed entities of any size and state," B. Jirgensons and M. E. Straumanis, A Short Textbook on Colloidal Chemistry (2nd ed.), The Macmillan Co., N.Y., 1962, pages 1 and 178 through 183 in particular. However, the particular disperse systems of the present invention form a subgenus within this broad class of disperse systems, this subgenus being characterized by several important features.

This subgenus comprises those disperse systems wherein at least a portion of the particles dispersed therein are solid, metal-containing particles formed in situ. At least about 10% to about 50% are particles of this type and preferably, substantially all of said solid particles are formed in situ.

So long as the solid particles remain dispersed in the dispersing medium as colloidal particles the particle size is not critical. Ordinarily, the particles will not exceed 5000 A. However, it is preferred that the maximum unit particle size be less than about 1000 A. In a particularly preferred aspect of the invention, the unit particle size is less than about 400 A. Systems having a unit particle size in the range of 30 A. to 200 A. give excellent results. The minimum unit particle size is at least 20 A. and preferably at least about 30 A.

The language "unit particle size" is intended to designate the average particle size of the solid, metal-containing particles assuming maximum dispersion of the individual particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems. Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal-containing particles." Obviously, the "particle size" of the agglomerate is substantially greater than the unit particle size. Furthermore, it is equally apparent that this agglomerate size is subject to wide variations, even within the same disperse system. The agglomerate size varies, for example, with the degree of shearing action employed in dispersing the unit particles. That is, mechanical agitation of the disperse system tends to break down the agglomerates into the individual components thereof and disperse these individual components throughout the disperse medium. The ultimate in dispersion is achieved when each solid, metal-containing particle is individually dispersed in the medium. Accordingly, the disperse systems are characterized with reference to the unit particle size, it being apparent to those skilled in the art that the unit particle size represents the average size of solid, metal-containing particles present in the system which can exist independently. The average particle size of the metal-containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the overbased material and conversion agent produces sufficient particle dispersion.

Basically, the solid metal-containing particles are in the form of metal salts of inorganic acids and low molecular weight organic acids, hydrates thereof, or mixtures of these. These salts are usually the alkali and alkaline earth metal formates, acetates, carbonates, hydrogen carbonates, hydrogen sulfides, sulfites, hydrogen sulfites, and halides, particularly chlorides. In other words, the metal-containing particles are ordinarily particles of metal salts, the unit particle is the individual salt particle and the unit particle size is the average particle size of the salt particles which is readily ascertained, as for example, by conventional X-ray defraction techniques. Colloidal disperse systems possessing particles of this type are sometimes referred to as macromolecular colloidal systems.

Because of the composition of the colloidal disperse systems of this invention, the metal-containing particles also exist as components in micellar colloidal particles. In addition to the solid metal-containing particles and the disperse medium, the colloidal disperse systems of the invention are characterized by a third essential component, one which is soluble in the medium and contains in the molecules thereof a hydrophobic portion and at least one polar substituent. This third component can orient itself along the external surfaces of the above metal salts, the polar groups lying along the surface of these salts with the hydrophobic portions extending from the salts into the disperse medium forming micellar colloidal particles. These micellar colloids are formed through weak intermolecular forces, e.g., Van der Waals forces, etc. Micellar colloids represent a type of agglomerate particle as discussed hereinabove. Because of the molecular orientation in these micellar colloidal particles, such particles are characterized by a metal containing layer (i.e., the solid metal-containing particles and any metal present in the polar substituent of the third component, such as the metal in a sulfonic or carboxylic acid salt group), a hydrophobic layer formed by the hydrophobic portions of the molecules of the third component and a polar layer bridging said metal-containing layer and said hydrophobic layer, said polar bridging layer comprising the polar substituents of the third component of the system, e.g., the group if the third component is an alkaline earth metal petrosulfonate.

The second essential component of the colloidal disperse system is the dispersing medium. The identity of the medium is not a particularly critical aspect of the invention as the medium primarily serves as the liquid vehicle in which solid particles are dispersed. The disperse medium will normally consist of inert organic liquids, that is, liquids which are chemically substantially inactive in the particular environment in question (the resinous composition). While many of these inert organic liquids are nonpolar, this is not essential. For example, many of the plasticizers for the resinous components of the composition are esters, etc. These polar materials can also be used as the dispersing medium or components thereof. The medium can have components characterized by relatively low boiling points, e.g., in the range of 25° to 120° C. to facilitate subsequent removal of a portion or substantially all of the medium from the polymeric resin composition or the components can have a higher boiling point to protect against removal from the resinous composition upon standing or heating. Obviously, there is no criticality in an upper boiling point limitation on these liquids.

Representative liquids include the alkanes and haloalkanes of five to eighteen carbons, polyhalo- and perhaloalkanes of up to about six carbons, the cycloalkanes of five or more carbons, the corresponding alkyl- and/or halo-substituted cycloalkanes, the aryl hydrocarbons, the alkylaryl hydrocarbons, the haloaryl hydrocarbons, ethers such as dialkyl ethers, alky aryl ethers, cycloalkyl ethers, cycloalkylalkyl ethers, alkanols, alkylene glycols, polyalkylene glycols, alkyl ethers of alkylene glycols and polyalkylene glycols, dimethyl formamide, dimethyl acetamide, dibasic alkanoic acid diesters, silicate esters, and mixtures of these. Specific examples include petroleum ether, Stoddard solvent, pentane, hexane, octane, isooctane, undecane, tetradecane, cyclopentane, cyclohexane, isopropylcyclohexane, 1,4-dimethylcyclohexane, cyclooctane, benzene, toluene, xylene, ethyl benzene, tert-butyl-benzene, halobenzenes especially mono- and polychlorobenzenes such as chlorobenzene per se and 3,4-dichlorotoluene, mineral oils, n-propylether, isopropylether, isobutylether, n-amylether, methyl-n-butylether, methyl-n-amyl-ether, cyclohexylether, ethoxycyclohexane, methoxybenzene, isopropoxybenzene, p-methoxytoluene, methanol, ethanol, propanol, isopropanol, hexanol, n-octyl alcohol, n-decyl alcohol, alkylene glycols such as ethylene glycol and propylene glycol, diethyl ketone, dipropyl ketone, methylbutyl ketone, acetophenone, 1,2-difluorotetrachloroethane, dichlorofluoromethane, 1,2-dibrometetrafluoroethane, trichlorofluoromethane, 1-chloropentane, 1,3-dichlorohexane, formamide, dimethylformamide, acetamide, dimethylacetamide, diethylacetamide, propionamide, di-isooctyl azelate, ethylene glycol, polypropylene glycols, hexa-2-ethylbutoxy disiloxane, etc.

Also useful as dispersing mediums are the low molecular weight, liquid polymers, generally classified as oligomers, which include the dimers, tetramers, phentamers, etc. Illustrative of this large class of materials are such liquids as the propylene tetramers, isobutylene dimers, and the like.

From the standpoint of availability, cost, and performance, the alkyl, cycloalkyl, and aryl hydrocarbons represent a preferred class of disperse mediums. Liquid petroleum fractions represent another preferred class of disperse mediums. Included within these preferred classes are benzenes and alkylated benzers, cycloalkanes and alkylated cycloalkanes, cyclo-alkenes and alkylated cycloalkenes such as found in naphthene-based petroleum fractions, and the alkanes such as found in the paraffin-based petroleum fractions. Petroleum ether, naphthas, mineral oils, Stoddard solvent, toluene, xylene, etc., and mixtures thereof are examples of economical sources of suitable inert organic liquids which can function as the disperse medium in the colloidal disperse systems of the present invention.

The most preferred disperse systems are those containing at least some mineral oil as a component of the disperse medium. These systems are particularly effective as lubricants for the polymeric composition, an important feature in extrusion processes. Any amount of mineral oil is beneficial in this respect. However, in this preferred class of systems, it is desirable that mineral oil comprise at least about 1% by weight of the total medium, and preferably at least about 5% by weight. Those mediums comprising at least about 10% by weight mineral oil are especially useful. As will be seen hereinafter, mineral oil can serve as the exclusive disperse medium.

In addition to the solid, metal-containing particles in the disperse medium, the two essential elements of any disperse system, the disperse systems employed in the polymeric compositions of the invention require a third essential component. This third component is an organic compound which is soluble in the disperse medium, and the molecules of which are characterized by a hydrophobic portion and at least one polar substituent. As explained, infra, the organic compounds suitable as a third component are extremely diverse. These compounds are inherent constituents of the disperse systems as a result of the methods used in preparing the systems. Further characteristics of the components are apparent from the following discussion of methods for preparing the colloidal disperse systems.

PREPARATION OF THE DISPERSE SYSTEMS

Broadly speaking, the colloidal disperse systems of the invention are prepared by treating a single phase homogeneous, Newtonian system of an "overbased," "superbased," or "hyperbased," organic compound with a conversion agent, usually an active hydrogen containing compound, the treating operation being simply a thorough mixing together of the two components, i.e., homogenization. This treatment converts these single phase systems into the non-Newtonian colloidal disperse systems utilized in conjunction with the polymeric resins of the present invention.

The terms "overbased," "superbased," and "hyperbased," are terms of art which are generic to well-known classes of metal-containing materials which have generally been employed as detergents and/or dispersants in lubricating oil compositions. These overbased materials have also been referred to as "complexes," "metal complexes," "high-metal containing salts," and the like. Overbased materials are characterized by a metal content in excess of that which would be present according to the stoichiometry of the metal and the particular organic compound reacted with the metal, e.g., a carboxylic or sulfonic acid. Thus, if a monosulfonic acid, is neutralized with a basic metal compound, e.g., calcium hydroxide, the "normal" metal salt produced will contain one equivalent of calcium for each equivalent of acid, i.e., However, as is well-known in the art, various processes are available which result in an enert organic liquid solution of a product containing more than the stoichiometric amount of metal. The solutions of these products are referred to herein as overbased materials. Following these procedures, the sulfonic acid or an alkali or alkaline earth metal salt thereof can be reacted with a metal base and the product will contain an amount of metal in excess of that necessary to neutralize the acid, for example, 4.5 times as much metal as present in the normal salt of a metal excess of 3.5 equivalents. The actual stoichiometric excess of metal can vary considerably, for example, from about 0.1 equivalent to about 30 or more equivalents depending on the reactions, the process conditions, and the like. These overbased materials useful in preparing the disperse systems will contain from about 3.5 to about 30 or more equivalents of metal for each equivalent of material which is overbased.

In the present specification and claims the term "overbased" is used to designate materials containing a stoichiometric excess of metal and is, therefore, inclusive of those materials which have been referred to in the art as overbased, superbased, hyperbased, etc., as discussed supra.

The terminology "metal ratio" is used in the prior art and herein to designate the ratio of the total chemical equivalents of the metal in the overbased material (e.g., a metal sulfonate or carboxylate) to the chemical equivalents of the metal in the product which would be expected to result in the reaction between the organic material to be overbased (e.g., sulfonic or carboxylic acid) and the metal-containing reactant (e.g., calcium hydroxide, barium oxide, etc.) according to the known chemical reactivity and stoichiometry of the two reactants. Thus, the normal calcium sulfonate discussed above, the metal ratio is one and in the overbased sulfonate, the metal ratio is 4.5. Obviously, if there is present in the material to be overbased more than one compound capable of reacting with the metal, the "metal ratio" of the product will depend upon whether the number of equivalents of metal in the overbased product is compared to the number of equivalents expected to be present for a given single component or a combination of all such components.

Generally, these overbased materials are prepared by treating a reaction mixture comprising the organic material to be overbased, a reaction medium consisting essentially of at least one, an inert, organic solvent for said organic material, a stoichiometric excess of a metal base, and a promotor with an acidic material. The methods for preparing the overbased materials as well as an extremely diverse group of overbased materials are well-known in the prior art and are disclosed, for example in the following U.S. patents: 2,616,904, 2,616,905, 2,616,906, 2,616,911, 2,616,924, 2,616,925, 2,617,049, 2,695,910, 2,723,234, 2,723,235, 2,723,236, 2,760,970, 2,767,164, 2,767,209, 2,777,874, 2,798,852, 2,839,470, 2,856,359, 2,856,360, 2,856,361, 2,861,951, 2,883,340, 2,915,517, 2,959,551, 2,968,642, 2,971,014, 2,989,463, 3,001,981, 3,027,325, 3,070,581, 3,108,960, 3,147,232, 3,133,019, 3,146,201, 3,152,991, 3,155,616, 3,170,880, 3,170,881, 3,172,855, 3,194,823, 3,223,630, 3,232,883, 3,242,079, 3,242,080, 3,250,710, 3,256,186, 3,274,135. The disclosures of these patents disclose exemplary processes for synthesizing the overbased materials used in producing the disperse systems of the invention and are, accordingly, incorporated herein by reference for their disclosures of these processes, materials which can be overbased, suitable metal bases, promoters, and acidic materials, as well as a variety of specific overbased products.

An important characteristic of the organic materials which are overbased is their solubility in the particular reaction medium utilized in the overbasing process. As the reaction medium used previously has normally comprised petroleum fractions, particularly mineral oils, these organic materials have generally been oil-soluble. However, if another reaction medium is employ (e.g., aromatic hydrocarbons, aliphatic hydrocarbons, kerosene, etc.) it is not essential that the organic material be soluble in mineral oil as long as it is soluble in the given reaction medium. Obviously, many organic materials which are soluble in mineral oils will be soluble in many of the other indicated suitable reaction mediums. It should be apparent that the reaction medium usually becomes the disperse medium of the colloidal disperse system or at least a component thereof depending on whether or not additional inert organic liquid is added as part of the reaction medium or the disperse medium.

Materials which can be overbased are generally oil-soluble organic acids including phosphorus acids, thiophosphorus acids, sulfur acids, carboxylic acids, thiocarboxylic acids, and the like, as well as the corresponding alkali and alkaline earth metal salts thereof. Representative examples of each of these classes of organic acids as well as other organic acids, e.g., nitrogen acids, arsenic acids, etc. are disclosed along with methods, of preparing overbased products therefrom in the above cited patent and are, accordingly, incorporated herein by reference. Patent 2,777,874 identifies organic acids suitable for preparing overbased materials which can be converted to disperse systems for use in the resinous compositions of the invention. Similarly, 2,616,904, 2,695,910, 2,767,164, 2,767,209, 3,147,232, 3,274,135, etc. disclose a variety of organic acids suitable for preparing overbased materials as well as representative examples of overbased products prepared from such acids. Overbased acids wherein the acid is a phosphorus acid, a thiophosphorus acid, phosphorus acid-sulfur acid combination, and sulfur acid prepared from polyolefins are disclosed in 2,883,340, 2,915,517, 3,001,981, 3,108,960, and 3,232,883. Overbased phenates are disclosed in 2,959,551 while overbased ketones are found in 2,798,852. A variety of overbased materials derived from oil-soluble metal-free, non-tautomeric neutral and basic organic polar compounds such as esters, amines, amides, alcohols, ethers, sulfides, sulfoxides, and the like are disclosed in 2,968,642, 2,971,014, and 2,989,463. Another class of materials which can be overbased are the oil-soluble, nitro-substituted aliphatic hydrocarbons, particularly nitro-substituted polyolefins such as polyethylene, polypropylene, polyisobutylene, etc. Materials of this type are illustrated in 2,959,551. Likewise, the oil-soluble reaction product of alkylene polyamines such as propylene diamine or N-alkylated propylene diamine with formaldehyde or formaldehyde producing compound (e.g., paraformaldehyde) can be overbased. Other compounds suitable for overbasing are disclosed in the above-cited patents or are otherwise well-known in the art.

The organic liquids used as the disperse medium in the colloidal disperse system can be used as solvents for the overbasing process.

The metal compounds used in preparing the overbased materials are normally the basic salts of metals in Group I-A and Group II-A of the Periodic Table although other metals such as lead, zinc, manganese, etc. can be used in the preparation of overbased materials. The anionic portion of the salt can be hydroxyl, oxide, carbonate, hydrogen carbonate, nitrate, sulfite, hydrogen sulfite, halide, amide, sulfate etc. as disclosed in the above-cited patents. For purposes of this invention the preferred overbased materials are prepared from the alkaline earth metal oxides, hydroxides, and alcoholates such as the alkaline earth metal lower alkoxides. The most preferred disperse systems of the invention are made from overbased materials containing calcium and/or barium as the metal.

The promoters, that is, the materials which permit the incorporation of the excess metal into the overbased material, are also quite diverse and well-known in the art as evidenced by the cited patents. A particularly comprehensive discussion of suitable promoters is found in 2,777,874; 2,695,910; and 2,616,904. These include the alcoholic and phenolic promoters which are preferred.

The alcoholic promoters include the alkanols of one to about twelve carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in 2,777,874, e.g., heptylphenoles, octylphenols, and nonylphenols. Mixtures of various promoters are sometimes used.

Suitable acidic materials are also disclosed in the above cited patents, for example, 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acidic material although inorganic acidic materials such as HCl, $SO_2$, $SO_3$, $CO_2$, $H_2S$, $N_2O_3$, etc., are ordinarily employed as the acidic materials. The most preferred acidic materials are carbon dioxide and acetic acid.

In preparing overbased materials, the material to be overbased, an inert, non-polar, organic solvent therefor, the metal base, the promoter, and the acidic material are brought together and a chemical reaction ensues. The exact nature of the resulting overbased product is not known. However, it can be adequately described for purposes of the present specification as a single phase homogeneous mixture of the solvent and (1) either a metal complex formed from the metal base, the acidic material, and the material being overbased and/or (2) an armorphous metal salt formed from the reaction of the acidic material with the metal base and the material which is said to be overbased. Thus, if mineral oil is used as the reaction medium, petrosulfonic acid as the material which is overbased, $Ca(OH)_2$ as the metal base, and carbon dioxide as the acidic material, the resulting overbased material can be described for purposes of this invention as an oil solution of either a metal containing a complex of the acidic material, the metal base, and the petrosulfonic acid or as an oil solution of amorphous calcium carbonate and calcium petrosulfonate. Since the overbased materials are well-known and as they are used merely as intermediates in the preparation of the disperse systems employed herein, the exact nature of the materials is not critical to the present invention.

The temperature at which the acidic material is contacted with the remainedr of the reaction mass depends to a large measure upon the promoting agent used. With a phenolic promoter, the temperature usually ranges from about 80° C. to 300° C., and preferably from about 100° C. to about 200° C. When an alcohol or mercaptain is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., an alkyl phenol) or otherwise readily removable from the overbased material, at least some promoter remains in the overbased product. Accordingly, the disperse systems made from such products may also contain the promoter. The presence or absence of the promoter in the overbased material used to prepare the disperse system and likewise, the presence or absence of the promoter in the colloidal disperse systems themselves does not represent a critical aspect of the invention. Obviously, it is within the skill of the art to select a volatile promoter such as a lower alkanol, e.g., methanol, ethanol, etc., so that the promoter can be readily removed prior to forming the disperse system or thereafter.

A preferred class of overbased materials used as starting materials in the preparation of the disperse systems of the present invention are the alkaline earth metal-overbased oil-soluble organic acids, preferably those containing at least twelve aliphatic carbons although the acids may contain as few as eight aliphatic carbon atoms if the acid molecule includes an aromatic ring such as phenyl, naphthyl, etc. Representative organic acids suitable for preparing these overbased materials are discussed and identified in detail in the above-cited patents. Particularly 2,616,904, and 2,777,874 disclose a variety of very suitable organic acids. For reasons of economy and performance, overbased oil-soluble carboxylic and sulfonic acids are particularly suitable. Illustrative of the carboxylic acids are palmitic acid, stearic acid, myristic acid, oleic acid, linoleic acid, behenic acid, hexatriacontanoic acid, tetrapropylene-substituted glutaric acid, polyisobutene (M.W.—5000)-substituted succinic acid, polypropylene (M.W.—10,000)-substituted succinic acid, octadecyl-substituted adipic acid, chlorostearic acid, 9-methyl-stearic acid, dichlorostearic acid, stearylbenzoic acide, eicosane-substituted naphthoic acid, dilauryl-decahydronaphthalene carboxylic acid, didodecyl-tetralin carboxylic acid, dioctyl-cyclohexane carboxylic acid, mixtures of these acids, their alkali and alkaline earth metal salts, and/or their anhydrides. Of the oil-soluble sulfonic acids, the mono-, di-, and tri-aliphatic hydrocarbon substituted aryl sulfonic acids and the petroleum sulfonic acids (petrosulfonic acids) are particularly preferred. Illustrative examples of suitable sulfonic acids include mahogany sulfonic acids, petrolatum sulfonic acids, mono-eicosane-substituted naphthalene sulfonic acids, dodecylbenzene sulfonic acids, didodecylbenzene sulfonic acids, dinonylbenzene sulfonic acids, cetyl-chlorobenzene sulfonic acids, dilauryl beta-napthalene sulfonic acids, the sulfonic acid derived by the treatment of polyisobutene having a molecular weight of 1500 with chlorosulfonic acid, nitronaphthalene-sulfonic acide, paraffin wax sulfonic acid, cetyl-cyclopentane sulfonic acid, lauryl-cyclohexanesulfonic acids, polyethylene (M.W.—750) sulfonic acids, etc. Obviously, it is necessary that the size and number of aliphatic groups on the aryl sulfonic acids be sufficient to render the acids soluble. Normally the aliphatic groups will be alkyl and/or alkenyl groups such that the total number of aliphatic carbons is at least twelve.

Within this preferred group of overbased carboxylic and sulfonic acids, the barium and calcium overbased mono-, di-, and trialkylated benzene and naphthalene (including hydrogenated forms thereof), petrosulfonic acids, and higher fatty acids are especially preferred. Illustrative of the synthetically produced alkylated benzene and naphthalene sulfonic acids are those containing alkyl substituents having from 8 to about 30 carbon atoms therein. Such acids include di-isododecyl-benzene sulfonic acid, wax-substituted phenol sulfonic acid, wax-substituted benzene sulfonic acids, polybutene-substituted sulfonic acid, cetyl-chlorobenzene sulfonic acid, di-cetylnaphthalene sulfonic acid, di-lauryldiphenylether sulfonic acid, di-isononylbenzene sulfonic acid, di-isooctadecylbenzene-sulfonic acid, stearylnaphthalene sulfonic acid, and the like. The petroleum sulfonic acids are well-known art recognized class of materials which have been used as starting materials in preparing overbased products since the inception of overbasing techniques as illustrated by the above patents. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acids, alkyl-substituted cycloaliphatic sulfonic acids including cycloalkyl sulfonic acids and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, white oil sulfonic acid, petrolatum sulfonic acid, petroleum naphthene sulfonic acid, etc. This especially preferred group of aliphatic fatty acids includes the saturated and unsaturated higher fatty acids containing from 12 to about 30 carbon atoms. Illustrative of these acids are lauric acid, palmitic acid, oleic acid, linoleic acid, linolenic acid, oleostearic acid, stearic acid, myristic acid, and undecalinic acid, alpha-chlorostearic acid and alpha-nitrolauric acid.

As shown by the representative examples of the preferred classes of sulfonic and carboxylic acids, the acids may contain non-hydrocarbon substituents such as halo, nitro, alkoxy, hydroxyl, and the like.

It is desirable that the overbased materials used to prepare the disperse system have a metal ratio of at least 3.5 and preferably about 4.5 An especially suitable group of the preferred sulfonic acid overbase materials has a metal ratio of at least about 7.0. While overbase materials having a metal ratio of 75 have been prepared, normally the maximum metal ratio will not exceed about 30 and, in most cases not more than about 20.

The overbased materials used in preparing the colloidal disperse systems contain from about 10% to about 70% by weight of metal containing components. As explained hereafter, the exact nature of these metal containing components is not known. It is theorized that the metal base, the acidic material, and the organic material being overbased form a metal complex, this complex being the metal-containing component of the overbased material. On the other hand, it has also been postulated that the metal base and the acidic material form amorphous metal compounds which are dissolved in the inert organic reaction medium and the material which is said to be overbased. The material which is overbased may itself be a metal-containing compound, e.g., a carboxylic or sulfonic acid metal salt. In such a case, the metal-containing components of the overbased material would be both the amorphous compounds and the acid salt. The exact nature of these overbased materials is obviously not critical in the present invention since these materials are used only as intermediates. The remainder of the overbased materials consist essentially of the inert organic reaction medium and any promoter which is not removed from the overbased product. For purposes of this application, the organic material which is subjected to overbasing is considered a part of the metal containing components. Normally, the liquid reaction medium constitutes at least about 30% by weight of the reaction mixture utilized to prepare the overbased materials.

As mentioned above, the colloidal disperse system can be prepared by homogenzing a "conversion agent" and the overbased starting material. Homogenization is achieved by vigorous agitation of the two components, preferably at the reflux temperature or a temperature slightly below the reflux temperature. The reflux temperature normally will depend upon the boiling point of the conversion agent. However, homogenization may be achieved within the range of about 25° C. to about 200° C. or slightly higher. Usually, there is no real advantage in exceeding 150° C. The process of the present invention replaces this batch process.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed. Concentrations beyond 60% appear to afford no additional advantages.

The terminology "conversion agent" as used in the specification and claims is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of oxygen, carbon dioxide, air and mixtures of two or more of these, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, oxygen, air, and carbon dioxide. Mixtures of two or more of these conversion agents are also useful. Particularly useful conversion agents are discussed below.

The lower aliphatic carboxylic acids are those containing less than about eight carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloroacetic acid, trichloroacetic acid, etc. Formic acid, acetic acid, and propionic acid, are preferred with acetic acid being especially suitable. It is to be understood that the anhydrides of these acids are also useful and, for the purposes of the specification and claims of this invention, the term acid in intended to include both the acid per se and the anhydride of the acid.

Useful alcohols include aliphatic, cycloaliphatic, and arylaliphatic mono- and polyhydroxy alcohols. Alcohols having less than about twelve carbons are especially useful while the lower alkanols, i.e., alkanols having less than about eight carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc., cycloalkyl alcohols exemplified by cyclopentanol, cyclohexanol, 4-methylcyclohexanol, 2-cyclohexylethanol, cyclopentylmethanol, etc.; phenyl aliphatic alkanols such as benzyl alcohol, 2-phenylethanol, and cinnamyl alcohol; alkylene glycols of up to about six carbon atoms and mono-lower alkyl ethers thereof such as monoethylether of ethylene glycol, diethylene glycol, ethylene glycol, trimethylene glycol, hexamethylene glycol, triethylene glycol, 1,4-butanediol, 1,4-cyclohexanediol, glycerol, and pentaerythritol.

The use of a mixture of water and one or more of the alcohols is especially effective for converting the overbased materials to colloidal disperse systems. Such combinations often reduce the length of time required for the process. Any water-alcohol combination is effective but a very effective combination in a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is a mixture of two or more lower alkanols, particularly methyl alcohol, ethyl alcohol, propyl alcohols, butyl alcohols, and pentyl alcohols, are especially suitable. Alcohol:water conversions are illustrated in copending application Ser. No. 535,693, filed Mar. 21, 1966.

Phenols suitable for use as conversion agents include phenol, naphthol, ortho-cresol, para-cresol, catechol, mixtures of cresol, para-tert-butylphenol, and other lower alkyl substituted phenols, meta-polyisobutene(M.W.—350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclic amines are also useful providing they contain at least one amino group having at least one active hydrogen attached thereto. Illustrative of these amines are the mono- and dialkylamines, particularly mono- and di-lower alkylamines, such as methylamine, ethylamine, propylamine, dodecylamine, methyl ethylamine, diethylamine; the cycloalkylamines such as cyclohexylamine, cyclopentylamine, and the lower alkyl-substituted cycloalkylamines such as 3-methylcyclohexylamine; 1,4-cyclohexylenediamine; arylamines such as aniline, mono-, di-, and tri-, lower alkyl-substituted phenyl amines, naphthylamines, 1,4-phenylene diamines; lower alkanol amines such as ethanolamine and diethanolamine; alkylene diamines such as ethylene diamine, diethylene triamine, triethylene tetramine, propylene diamines, octamethylene diamines; and heterocyclic amines such as piperazine, 4-aminoethylpiperazine, 2-octadecyl-imidazoline; and oxazolidine. Boron acids are also useful conversion agents and include boronic acids (e.g., alkyl-$B(OH)_2$ or aryl-$B(OH_2)$, boric acid (i.e., $H_3BO_3$), tetraboric acid, metaboric acid, and esters of such boron acids.

The phosphorus acids are useful conversion agents and include the various alkyl and aryl phosphinic acids, phosphinus acids, phosphonic acids, and phosphonous acids. Phosphorus acids obtained by the reaction of lower alkanols or unsaturated hydrocarbons such as polyisobutenes with phosphorus oxides and phosphorus sulfides are particularly useful, e.g., $P_2O_5$ and $P_2S_5$.

Oxygen, carbon dioxide, air, and various mixtures of oxygen and carbon dioxide can be used as conversion agents but they are not particularly suited for the present process due to the pressure-maintaining apparatus required to use them. If employed, it is preferable to use these conversion agents in combination with one or more of the foregoing conversion agents. For example, the combination of water and carbon dioxide is particularly effective as a conversion agent for transforming the overbased materials into a colloidal disperse system.

As previously mentioned, the overbased materials are single phase homogeneous systems. However, depending on the reaction conditions and the choice of reactants in preparing the overbased materials, there sometimes is present in the product insoluble contaminants. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Obviously a more uniform disperse system makes it possible to achieve reproducability of properties in resinous compositions containing such systems. Accordingly, it is prefered that any insoluble contaminants in the overbased materials be removed prior to converting the material in the colloidal disperse system. The removal of such contaminants is easily accomplished by conventional techniques such as filtration or centrifugation. It should be understood however, that the removal of these contaminants, while desirable for reasons just mentioned, is not an absolute essential aspect of the invention and useful products can be obtained when overbased materials containing insoluble contaminants are converted to the colloidal disperse systems.

The conversion agents or a proportion thereof may be retained in the colloidal disperse system. The conversion agents are however, not essential components of these disperse systems and it is usually desirable that as little of the conversion agents as possible be retained in the disperse systems. Since these conversion agents do not react with the overbased material in such a manner as to be permanently bound thereto through some type of chemical bonding, it is normally a simple matter to remove a major proportion of the conversion agents and, generally, substantially all of the conversion agents. Some of the conversion agents have physical properties which make them readily removable from the disperse systems. Thus, most of the free carbon dioxide and/or oxygen gradually escape from the disperse system during the homogenization process or upon standing thereafter. Since the liquid conversion agents are generally more volatile than the remaining components of the disperse system, they are readily removable by conventional devolatilization techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

Again, it is not essential that all of the conversion agent be removed from the disperse systems. In fact, useful disperse systems for employment in the resinous compositions of the invention result without removal of the conversion agents. However, from the standpoint of achieving uniform results, it is generally desirable to remove the conversion agents, particularly where they are volatile. In some cases, the liquid conversion agents may facilitate the mixing of the colloidal disperse system with the polymeric resin material. In such cases, it is advantageous to permit the conversion agents to remain in the disperse system until it is mixed with the polymeric resin. Thereafter, the conversion agents can be removed from the mixture of the disperse system and polymeric resins by conventional devolatilization techniques if desired.

To better illustrate the colloidal disperse systems produced by the process of this invention, a preferred system is described below. It is prepared according to the process of applicant's earlier applications maintained hereinbefore.

THE OVERBASED MATERIAL

As stated above, the essential materials for preparing an overbased product are (1) the organic material to be overbased, (2) an inert, non-polar organic solvent for the organic material, (3) a metal base, (4) a promoter, and (5) an acidic material. In this example, these materials are (1) calcium petrosulfonate, (2) mineral oil, (3) calcium hydroxide, (4) a mixture of methanol, isobutanol, and n-pentanol, and (5) carbon dioxide.

A reaction mixture of 1305 grams of calcium sulfonate having a metal ratio of 2.5 dissolved in mineral oil, 220 grams of methyl alcohol, 72 grams of isobutanol, and 38 grams of n-pentanol is heated to 35° C. and subjected to the following operating cycle four times; mixing with 143 grams of 90% calcium hydroxide and treating the mixture with carbon dioxide until it has a base number of 32–39. The resulting product is then heated to 155° C. during a period of 9 hours to remove the alcohols and then filtered at this temperature. The filtrate is a calcium overbased petrosulfonate having a metal ratio of 12.2.

CONVERSION TO A COLLOIDAL DISPERSE SYSTEM

A mixture of 150 parts of the overbased material, 15 parts of methyl alcohol, 10.5 parts of n-pentanol and 45 parts of water is heated under reflux conditions at 71°–74° C. for 13 hours. The mixture becomes a gel. It is then heated to 144° C. over a period of 6 hours and diluted with 126 parts of mineral oil having a viscosity of 2000 SUS at 100° F. and the resulting mixture heated at 144° C. for an additional 4.5 hours with stirring. This thickened product is a colloidal disperse system of the type contemplated by the present inventon. As exemplified hereafter, this conversion mixture also can be converted using the elongated heating tube of the present invention.

The disperse systems of the invention are characterized by three essential components: (A) solid, metal-containing particles formed in situ, (B) an inert, non-polar organic liquid which functions as the disperse medium, and (C) an organic compound which is soluble in the disperse medium and the molecules of which are characterized by a hydrophobic portion and at least one polar substituent. In the colloidal disperse system described immediately above, these components are as follows: (A) calcium carbonate in the form of solid particles, (B) mineral oil, and (C) calcium petrosulfonate.

From the foregoing example, it is apparent that the solvent for the material which is overbased becomes the colloidal disperse medium or a component thereof. Of course, mixtures of other inert liquids can be substituted for the mineral oil or used in conjunction with the mineral oil prior to forming the overbased material. Moreover, after the overbased material is prepared, additional liquid material, e.g., a plasticizer for the resin can be added if desired to form a part of the disperse medium.

It is also readily seen that the solid, metal-containing particles formed in situ possess the same chemical composition as would the reaction products of the metal base and the acidic material used in preparing the overbased materials. Thus, the actual chemical identity of the metal containing particles formed in situ depends upon both the particular metal base or bases employed and the particular acidic material or materials reacted therewith. For example, if the metal base used in preparing the overbased material were barium oxide and if the acidic material was a mixture of formic and acetic acids, the metal-containing particles formed in situ would be barium formates and barium acetates.

However, the physical characteristics of the particles formed in situ in the conversion step are quite different from the physical characteristics of any particles present in the homogeneous, single-phase overbased material which is subjected to the conversion. Particularly, such physical characteristics as particle size and structure are quite different. The solid, metal-containing particles of the colloidal disperse systems are of a size sufficient for detection by X-ray diffraction. The overbased material prior to conversion are not characterized by the presence of these detectable particles.

X-ray diffraction and electron microscope studies have been made of both overbased organic materials and colloidal disperse systems prepared therefrom. These studies establish the presence in the disperse systems of the solid, metal-containing salts. For example, in the disperse system prepared hereinabove, the calcium carbonate is present as solid calcium carbonate having a particle size of about 40 to 50 A. (unit particle size) and interplanar spacing ($dA$.) of 3.035. But X-ray diffraction studies of the overbased material from which it was prepared indicate the absence of calcium carbonate of this type. In fact, calcium carbonate present as such, if any, appears to be amorphous and in solution. While applicant does not intend to be bound by any theory offered to explain the changes which accompany the conversion step, it appears that conversion permits particle formation and growth. That is, the amorphous, metal-containing apparently dissolved salts or complexes present in the overbased material form solid, metal-containing particles which by a process of particle growth become colloidal particles. Thus, in the above example, the dissolved amorphous calcium carbonate salt or complex is transformed into solid particles which then "grow." In this example, they grow to a size of 40 to 50 A. In many cases, these particles apparently are crystallites. Regardless of the correctness of the postulated mechanism for in situ particle formation the fact remains that no particles of the type predominant in the disperse systems are found in the overbased materials from which they are prepared. Accordingly, they are unquestionably formed in situ during conversion.

As these solid metal-containing particles formed in situ come into existence, they do so as pre-wet, pre-dispersed solid particles which are inherently uniformly distributed throughout the other components of the disperse system. The liquid disperse medium containing these pre-wet dispersed particles is readily incorporated into various other compositions thus facilitating the uniform distribution of the particles. This pre-wet, pre-dispersed character of the solid metal-containing particles resulting from their in situ formation is, thus, an extremely important feature of the disperse system.

In the foregoing example, the third component of the disperse system (i.e., the organic compound which is soluble in the disperse medium and which is characterized by molecules having a hydrophobic portion and a polar substituent) is calcium petrosulfonate, wherein $R_1$ is the residu of the petrosulfonic acid. In this case, the hydrophobic portion of the molecule is the hydrocarbon moiety of petrosulfonic, i.e., $-R_1$. The polar substituent is the metal salt moiety, The hydrophobic portion of the organic compound is a hydrocarbon radical or a substantially hydrocarbon radical containing at least about twelve aliphatic carbon atoms. Usually the hydrocarbon portion is an aliphatic or cycloaliphatic hydrocarbon radical although aliphatic or cycloaliphatic substituted aromatic hydrocarbon radicals are also suitable. In other words, the hydrophobic portion of the organic compound is the residue of the organic material which is overbased minus its polar substituents. For example, if the material to be overbased is a carboxylic acid, sulfonic acid, or phosphorus acid, the hydrophobic portion is the residue of these acids which would result from the removal of the acid functions. Similarly, if the material to be overbased is a phenol, a nitro-substituted polyolefin, or an amine, the hydrophobic portion of the organic compound is the radical resulting from the removal of the hydroxyl, nitro, or amino group respectively. It is the hydrophobic portion of the molecule which renders the organic compound soluble in the solvent used in the overbasing process and later in the disperse medium.

Obviously, the polar portion of these organic compounds are the polar substituents such as the acid salt moiety discussed above. When the material to be overbased contains polar substituents which will react with the basic metal compound used in overbasing, for example, acid groups such as carboxy, sulfino, hydroxysulfonyl, and phosphorus acid groups or hydroxyl groups, the polar substituent of the third component is the polar group formed from the reaction. Thus, the polar substituent is the corresponding acid metal salt group or hydroxyl group metal derivative, e.g., an alkali or alkaline earth metal sulfonate, carboxylate, sulfinate, alcoholate, or phenate.

On the other hand, some of the materials to be overbased contained polar substituents which ordinarily do not react with metal bases. These substituents include nitro, amino, ketocarboxyl, carboalkoxy, etc. In the disperse systems derived from overbased materials of this type the polar substituents in the third component are unchanged from their identity in the material which was originally overbased.

The identity of the third essential component of the disperse system depends upon the identity of the starting materials (i.e., the material to be overbased and the metal base compound) used in preparing the overbased material. Once the identity of these starting materials is known, the identity of the third component in the colloidal disperse system is automatically established. Thus, from the identity of the original material, the identity of the hydrophobic portion of the third component in the disperse system is readily established as being the residue of that material minus the polar substituents attached thereto. The identity of the polar substituents on the third component is established as a matter of chemistry. If the polar groups on the material to be overbased undergo reaction with the metal base, for example, if they are acid functions, hydroxy groups, etc., the polar substituent in the final product will correspond to the reaction product of the original substituent and the metal base. On the other hand, if the polar substituent in the material to be overbased is one which does not react with metal bases, then the polar substituent of the third component is the same as the original substituent.

As previously mentioned, this third component can orient itself around the metal-containing particles to form micellar colloidal particles. Accordingly, it can exist in the disperse system as an individual liquid component dissolved in the disperse medium or it can be associated with the metal-containing particles as a component of micellar colloidal particles.

The following examples illustrate the preparation of typical overbased organic materials useful as starting materials in the process of this invention.

Example 1

To a mixture of 400 parts (by weight) of a 30% mineral oil solution of barium petroleum sulfonate (sulfate ash of 7.6%), 32.5 parts of octyl phenol, and 197 parts of water, there is added 73 parts of barium oxide within a period of 30 minutes at 57°–84° C. The mixture is heated at 100° C. for 1 hour to remove substantially all of the water and is then blown with 75 parts of carbon dioxide at 133°–170 C. within a period of 3 hours. A mixture of 1000 grams of the above carbonated intermediate product and 121.8 parts of octyl phenol and 234 parts of barium hydroxide is heated at 100° C. and then at 150° C. for one hour. The mixture is then blown with carbon dioxide at 150° C. for one hour at a rate of 3 cubic ft. per hour. The carbonated product, i.e., the overbased organic material, is filtered and the filtrate is found to have a sulfate ash content of 39.8% and a metal ratio of 9.3.

Example 2

To a mixture of 3245 grams (12.5 equivalents) of barium petroleum sulfonate, 1460 grams (7.5 equivalents) of heptyl phenol, and 2100 grams of water in 8045 grams of mineral oil there is added at 82° C., 7400 grams (96.5 equivalents) of barium oxide. The addition of barium oxide causes the temperature to rise to 145° C. which temperature is maintained until all of the water has been distilled. The mixture then is blown with carbon dioxide until it is substantially neutral. The product is diluted with 5695 grams of mineral oil and filtered. The filtrate is found to have a barium sulfate ash content of 30.5% and a metal ratio of 8.1.

Example 3

A mixture of 1285 grams (1.0 equivalent) of 40 percent barium petroleum sulfonate and 400 grams (12.5 equivalents) of methanol is stirred at 55–60° C. while 301 grams (3.9 equivalents) of barium oxide is added portionwise over a period of one hour. The mixture is stirred an additional two hours at 45–55° C., then treated with carbon dioxide at 55–65° C. for two hours. The resulting mixture is freed of methanol by heating to 150° C. The residue is filtered through a siliceous filter aid, the clear brown filtrate showing the analyses: sulfate ash, 33.2%, neut. no., slightly acid; metal ratio, 4.7.

Example 4

A solution of 1928 grams (1.5 equivalent) of 40 percent barium petroleum sulfonate in 1004 grams of oil and 150 grams (4.7 equivalents of methanol is prepared and heated to 40° C. Carbon dioxide is bubbled into this solution of 796 grams (10.4 equivalents) of barium oxide is added portionwise over a period of two hours. The temperature is maintained between 40° C. and 70° C. throughout and when all the barium oxide has been added the carbon dioxide-treatment is continued for an additional four hours. The resulting mixture is then heated to 150° C. and held at this temperature for 30 minutes to remove any volatile material. The residue is filtered, yielding a clear, brown filtrate having the following analyses: sulfate ash, 32.5%; neut. no., 1.2 (basic); metal ratio, 7.2.

Example 5

A stirred mixture of 57 grams (0.4 equivalent) of nonyl alcohol and 301 grams (3.9 equivalents) of barium oxide is heated at 150°–175° C. for an hour, then cooled to 80° C. whereupon 400 grams (12.5 equivalents) of methanol is added. The resultant mixture is stirred at 70°–75° C. for 30 minutes, then treated with 1285 grams (1.0 equivalent) of 40 percent barium petroleum sulfonate. This mixture is stirred at reflux temperature for an hour, then treated with carbon dioxide at 60°–70° C. for two hours. The mixture then is heated to 160° C./18 mm. and filtered. The filtrate is a clear, brown oil having the following analyses: sulfate ash, 32.5%; neut. no., nil; metal ratio, 4.7.

Example 6

A mixture of 574 grams (0.5 equivalent) of 40 percent barium petroleum sulfonate, 98 grams (1.0 equivalent) of furfuryl alcohol, and 762 grams of mineral oil is heated with stirring at 100° C. for an hour, then treated portionwise over a 15-minute period with 230 grams (3.0 equivalents) of barium oxide. During this latter period the temperature rises to 120° C. (because of the exothermic nature of the reaction of barium oxide and the alcohol); the mixture then is heated at 150°–160° C. for an hour, and treated subsequently at this temperature for 1.5 hours with carbon dioxide. The material is concentrated by heating to a final temperature of 150° C./10 mm. then filtered to yield a clear, oil-soluble filtrate having the following analyses: sulfate ash, 21.4%; neut. no., 2.6 (basic); metal ratio, 6.1.

Example 7

To a mixture of 1145 grams of a mineral oil solution of a 40 percent solution of barium mahogany sulfonate (1.0 equivalent) and 100 grams of methyl alcohol at 55° C. there is added 220 grams of barium oxide while the mixture is being blown with carbon dioxide at a rate of 2–3 cubic feet per hour. To this mixture there is added an additional 78 grams of methyl alcohol and then 460 grams of barium oxide while the mixture is being blown with carbon dioxide. The carbonated product is heated to 150° C. for one hour and filtered. The filtrate is found to have a barium sulfate ash content of 53.8 percent and a metal ratio of 8.9.

Example 8

A carbonated basic metal salt is prepared in accordance with the procedure of Example 7 except that a total of 15 equivalents of barium oxide is used per equivalent of the barium mahogany sulfonate used. The product is found to have a metal ratio of 13.4.

Example 9

A mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% equeous solution of calcium chloride and 72 parts of lime (90% purity) at 100° C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to distill off methyl alcohol and water and the resulting oil solution of the basic calcium sulfonate is filtered. The filtrate is found to have a calcium sulfate ash content of 16% and a metal ratio of 2.5. A mixture of 1305 grams of the above carbonated calcium sulfonate, 930 grams of mineral oil, 220 grams of methyl alcohol, 72 grams of isobutyl alcohol, and 38 grams of amyl alcohol is prepared, heated to 35° C., and subjected to the following operating cycle 4 times: mixing with 143 grams of 90% calcium hydroxide and treating the mixture with carbon dioxide until it has a base number of 32–39. The resulting product is then heated to 155° C. during a period of 9 hours to remove the alcohols and then filtered through a siliceous filter-aid at this temperature. The filtrate has a calcium sulfate ash content of 39.5%, and a metal ratio of 12.2.

Example 10

A basic metal salt is prepared by the procedure described in Example 9 except that the slightly basic calcium sulfonate having a metal ratio of 2.5 is replaced with a mixture of that calcium sulfonate (280 parts by weight) and tall oil acids (800 parts by weight, having an equivalent weight of 280) and that the total amount of calcium hydroxide used is 772 parts by weight. The resulting highly basic metal salt of the process has a calcium sulfate ash content of 42.3%, a metal ratio of 6.25, and an oil content of 38.9%.

Example 11

A highly basic metal salt is prepared by the procedure of Example 10 except that the slightly basic calcium starting material having a metal ratio of 2.5 is replaced with tall oil acids (1250 parts by weight, having an equivalent weight of 340) and the total amount of calcium hydroxide used is 772 parts by weight. The resulting highly basic metal salt has a metal ratio of 5.2, a calcuim sulfate ash content of 41%, and an oil content of 33%.

Example 12

A highly basic metal salt is prepared by the procedure of Example 10 except that the slightly basic calcium sulfonate starting material is replaced with a mixture of that basic calcium sulfonate (555 parts by weight) and tall oil acids (694 parts by weight having an equivalent weight of 340) and the amount of calcium hydroxide used is 772 parts by weight. The resulting metal salt has a metal ratio of 7.9, a calcium sulfate ash content of 45%, and an oil content of 32%.

Example 13

A basic metal salt is prepared by the process of Example 9 except that the amount of the slightly basic calcium sulfonate used is 1672 parts and the amount of the calcium hydroxide used is 1062 parts. The resulting highly basic metal salt has a metal ratio of 19 and a calcium sulfate ash content of 54.7%.

Example 14

A highly basic metal salt is prepared by the procedure of Example 13 except that the slightly basic calcium sulfonate starting material has a metal ratio of 1.6 and the amount of this calcium sulfonate used is 1050 parts (by weight) and that the total amount of lime used is 630 parts. The resulting metal salt has a calcium sulfate ash content of 40%, a metal ratio of 16 and an oil content of 35%.

Example 15

The procedure of Example 9 is repeated except that the sodium petroleum sulfonate is replaced by an equivalent amount of sodium polydodecyl benzene sulfonate. The resulting highly basic metal salt has a calcium sulfate ash content of 41.5% and a metal ratio of 13.1.

A preferred aspect in the formation of the disperse systems by the process of this invention is that the overbased organic material be substantially free from insoluble contaminants. For example, if any contaminants are present as a result of insufficient carbonation of the alkaline earth metal base used in preparing the overbased material, it is preferably filtered or centrifuged before it is used in the process of this invention. This is desirable since, unless they are removed, the resulting disperse system will not have the desired degree of homogeniety, in most cases.

The concentration of the metal-containing components in the overbased organic material preferably should be at least about 10% by weight. If the concentration is below about 10%, a satisfactory disperse system usually cannot be formed by the process.

When mineral oil is present in the conversion mixture, it is preferably one having a viscosity value ranging from 50 SUS (Saybolt Universal seconds) at 100° F. to 500 SUS at 210° F. Especially useful is a mineral oil from SAE 5 to SAE 120 grade. The source of the mineral oil is not critical. A preferred aspect of the invention involves using, as a starting material, an overbased organic material in which, at least a portion of the non-metal containing liquid component is mineral oil. Those overbased organic materials wherein this liquid component comprises at least 10% and preferably, at least 25% by weight mineral oil are especially suitable for conversion by the present process. Mineral oil can comprise the entire non-metal containing liquid component.

Additional thickening is desirable where the product formed by the process of this invention is to be used as a corrosion inhibiting composition. Particularly useful compositions are obtained when commercial resins are added to the product. Resins which have been found useful are the hydrocarbon resins which have a softening point of at least 100° C., and preferably having a softening point range of from 100°–130° C. Incorporation of such resins into the product results in a coating composition which is firm rather than soft and grease-like. This characteristic of the corrosion inhibiting compositions is desirable because it provides resistance to abrasion, dirt, and gravel pick-up, etc.

Examples of the hydrocarbon resins which have been found useful in the compositions of this invention include coumarone-indenes, polystyrenes, polymerized beta-pinenes, and higher molecular weight polyisobutylenes. Obviously, the resins chosen to be added to a particular composition must be miscible with the composition and soluble in any solvent used in the preparation.

The following examples illustrate the process for the preparation of the colloid disperse systems according to the process of this invention.

Example A

Thirty-two parts of a primary amyl alcohol, 64 parts of methyl alcohol, 800 parts of the overbased organic material of Example 9, are introduced into mixing tank No. 2 through line 1 in the order named while mixing with stirrer 3. Eighty parts of water is introduced to the mixing tank 2 with mixing in 5 minutes. The valve in line 4 is opened and the mixture is pumped during 55 minutes at 8.5 parts per minute and 225–260 p.s.i.g. as determined by the back pressure regulator 16, through the heating zone 13, consisting of 240 ft. of ¾ inch, jacketed steel pipe, heated with 171° C. steam. The heated product mixture is discharged from the heating zone 13 through line 14 into the receiver tank 18 containing 300 parts of a mineral oil having a viscosity of 2000 SUS at 100° F. The mixture in the receiving tank 19 is heated at 148°–153° C. for 1 hour while nitrogen at 13 parts per hr. is introduced via the submerged line 33. The distillate from the condenser 25 is collected in receiver 27. The disperse system is of a grease-like consistency containing 6.76% calcium, and 43.9% of the 2000 SUS mineral oil.

Example B

A solution of 103 parts of a commercial polystyrene resin having a softening point range of 110°–120° C. in 650 parts of the overbased organic material of Example 9, 52 parts of methyl alcohol, 26 parts of primary amyl alcohol, and 65 parts of water, are introduced into the mixing tank 2 through line 1 in the order named mixing with stirrer 3, at 38° C. After thorough mixing, the mixture is pumped during 62 minutes at 9.6 parts per minute and 250 p.s.i.g. as determined by back pressure regulator 16 through the heating zone 13, consisting of 240 feet of ¾ inch, jacketed steel pipe, heated with 171° C. steam. The heated product mixture is discharged from the heating zone 13 through line 14 into the receiver tank 19 containing 72 parts of a petroleum naphtha having a boiling range of 156°–193° C. The mixture in the receiver tank 19 is heated to 311° F. in 2 hours while removing 80 parts of aqueous distillate via line 31 from the phase separator 30 and returning the petroleum naphtha through line 32 to the receiver tank 19. The resulting product is a grease-like colloidal disperse system containing 8.8% calcium and 12.3% petroleum naphtha.

Example C

In the feed tank 2, 700 parts of the overbased organic material of Example 9, 56 parts of methyl alcohol, 28 parts of primary amyl alcohol, and 42 parts of water are thoroughly mixed by stirrer 3. The mixture is pumped at 10 parts per minute during 75 minutes under a pressure of 259 p.s.i.g. to the heating zone 13, consisting of 18 feet of ¼ inch jacketed pipe, heated with 167° C. steam. The heated reaction mixture is discharged from the heating zone 13 through line 14 into the receiver tank 19 containing 400 parts of a mineral oil having a viscosity of 2000 SUS at 100° F. The mixture in the receiver tank 19 is heated to 149° C. while nitrogen at the rate of 2 parts per hour is introduced via the submerged line 33. An additional 236 parts of 2000 SUS oil is added with mixing. The product is a non-Newtonian collodial disperse system containing 50% of the 2000 SUS mineral oil.

Example D

A combination of 393 parts of the overbased material of Example 13, 107 parts of mineral oil having a viscosity of 100 SUS, 40 parts of methyl alcohol, 20 parts of primary amyl alcohol, and 75 parts of water is charged to the feed tank 2 and mixed with mixer 3. The mixture is pumped at 20 parts per minute for 30 minutes at 240 p.s.i.g. through the heating zone 13, consisting of 18 feet of ¼ inch jacketed pipe heated with 171° C. steam. The heated product mixture is discharged from the heating zone 13 through line 14 into the receiver tank 19 containing 400 parts of a mineral oil having a viscosity of 2000 SUS. The mixture in the receiver tank is heated to 145° C. with nitrogen at 2 parts per hr. introduced via submerged line 33. An additional 72 parts of oil having a viscosity of 2000 SUS is added and thoroughly mixed yielding a final product containing 50% of the 2000 SUS mineral oil.

Example E

A grease composition is prepared according to the procedure of Example A except that 700 parts of the overbased organic material of Example 1 is used in place of that of Example 9. The resulting product is a grease-like non-Newtonian colloidal disperse system.

Example F

A composition having a grease-like consistency is formed by the process of Example A except that 700 parts of the overbased organic material of Example 14 is used in lieu of that of Example 9.

Example G

In the feed tank 2, 800 parts of the overbased organic material of Example 10, 800 parts of a mineral oil having a viscosity of 2000 SUS at 100° F., and 80 parts of acetic acid are mixed by stirrer 3. The mixture is pumped at 15 parts per minute for 100 minutes under a pressure of 150 p.s.i.g. through the heating zone 13, consisting of 18 feet of ¼ inch jacketed pipe, heated with 121° C. steam. The gelled product is discharged from heating zone 13 through line 14 into the receiving tank 19 where it is mixed with 400 parts of a petroleum naphtha having a boiling range of 156–193° C. The mixture in receiving tank 19 is heated to 193° C. in 3 hours while nitrogen is introduced at 2 parts per hour through submerged line 33. The distillate from the condenser 25 is collected in receiver 27. The product is grease-like in consistency.

By substituting other overbased organic materials and conversion agents in the indicated proportions, as discussed supra, for those utilized in Examples A–G, the corresponding non-Newtonian colloidal diperse systems can be prepared according to the process of the present invention. For example, by treating conversion mixtures of the earlier filed applications and patent mentioned hereinabove in the manner required by the present process and exemplified above, other colloidal disperse systems can be prepared.

What is claimed is:

1. A process for converting a member selected from the class consisting of alkali and alkaline earth metal overbased organic materials having a metal ratio of at least about 3.5, said material comprising at least about 30% by weight of non-metal containing liquid medium, into a non-Newtonian colloidal disperse system comprising passing a mixture of (1) an overbased material and (2) from about 1% to about 80% by weight based on the weight of said overbased organic material excluding the weight of the liquid medium of a conversion agent selected from the class consisting of water, lower aliphatic carboxylic acids, alcohols, phenols, ketones, aldehydes, amines, boron acids, and phosphorus acids, through an elongated heating zone under a pressure above about one atmosphere and sufficient to maintain the mixture in the liquid state at a temperature within the range of from about 90° C. to about 320° C. at such a rate that an increment of said mixture is in the heating zone for sufficient time to permit conversion to take place.

2. A process according to claim 1 wherein said overbased material is a liquid solution containing from about 10% to about 70% by weight of metal-containing components.

3. A process according to claim 2 wherein the conversion agent is selected from the class consisting of lower aliphatic carboxylic acids having from 1 to 8 carbon atoms, water, and water-alcohol mixtures.

4. A process according to claim 3 wherein the overbased material is a carbonated, alkaline earth metal overbased organic acid.

5. The process according to claim 4 wherein the liquid medium is selected from the class consisting of mineral oil and mixtures of mineral oil with mineral oil-miscible inert organic solvents.

6. The process according to claim 5 wherein the overbased organic materials have a metal ratio of from 4.5 to about 20.

7. The process of claim 6 wherein the alkaline earth metal overbased acid is a calcium overbased acid.

8. The process of claim 5 wherein the alkaline earth metal overbased acid is a barium overbased acid.

9. The process of claim 6 wherein the acid is an oil-soluble sulfonic acid.

10. The process of claim 5 wherein the acid is an oil-soluble carboxylic acid.

11. The process of claim 6 wherein the acid is a mixture of oil-soluble sulfonic and carboxylic acids.

12. The process of claim 6 wherein the alcohol portion of the water-alcohol mixture is a mixture of lower alkanols.

13. The process of claim 6 wherein the alcohol of the water-alcohol mixture is a mixture of at least two alkanols selected from the class of methyl alcohol, ethyl alcohol, propyl alcohols, butyl alcohols, and pentyl alcohols.

14. The process of claim 6 wherein the conversion agent is acetic acid.

15. The process comprising:
    (A) forming a mixture of (1) an overbased organic material comprising a fluid mineral oil solution containing from about 30% to about 70% by weight of carbonated, calcium overbased sulfonic acid having at least about 12 aliphatic carbon atoms and characterized by a metal ratio of from about 8 to about 20; and (2) from about 1% to about 80%, based on the weight of said overbased organic material exclusive of the mineral oil of a water-lower alkanol mixture.
    (B) passing said mixture through an elongated heating zone under a pressure above about one atmosphere and sufficient to maintain the mixture in the liquid state at a temperature within the range of from about 90° C. to about 320° C. at such a rate that an increment of said mixture is in the heating zone for sufficient time to permit conversion to take place.

References Cited

UNITED STATES PATENTS 2,948,679   8/1960   Rees et al. __________ 252—28

DANIEL E. WYMAN, *Primary Examiner.*

I. VAUGHN, *Assistant Examiner.*

UNITED STATES PATENT OFFICE
CERTIFICATE OF CORRECTION

Patent No. 3,377,283                                   April 9, 1968

Richard L. McMillen

It is certified that error appears in the above identified patent and that said Letters Patent are hereby corrected as shown below:

Column 1, line 53, "subequent" should read -- subsequent --; line 58, after "1967" insert -- , applicant discloses other colloidal disperse systems and processes for their preparation --. Column 2, line 41, "phosphoric" should read -- phosphorus --; line 42, "above one" should read -- above about one --; line 64, "vale 12" should read -- valve 12 --. Column 4, line 31, "non-Newtonial" should read -- non-Newtonian --. Column 6, line 58, "1,2-dibrome" should read -- 1,2-dibromo --; line 75, "alkylated benzers" should read -- alkylated benzenes --. Column 7, line 75, "enert" should read -- inert --. Column 8, line 55, "2,856,360" should read -- 2,859,360 --; line 75, "employ" should read -- employed --. Column 10, line 13, "nitrict" should read -- nitric --; line 29, "armorphous" should read -- amorphous --; line 37, "a complex" should read -- complex --; line 46, "remainedr" should read -- remainder --. Column 11, line 32, "acide" should read -- acid --. Column 12, line 46, "system" should read -- systems --. Column 13, line 34, "monoethylether" should read -- monomethylether --. Column 15, line 59, "inventon" should read -- invention --; line 65, "in situ" should read -- in situ --, in italics. Column 16, lines 9, 13, 19, 22, 57, 61, 62, 70 and 71, "in situ", each occurrence, should read -- in situ --, in italics. Column 17, line 6, "residu" should read -- residue --. Column 18, line 22, "170 C." should read -- 170° C. --; line 63, "(4.7 equivalents of" should read -- (4.7 equivalents) of --. Column 19, line 59, "equeous" should read -- aqueous --. Column 20, line 21, "calcium" should read -- calcium sulfonate --; line 27, "cuim" should read -- cium --. Column 24, line 1, "from 4.5" should read -- from about 4.5 --; line 18, "class of" should read -- class consisting of --.

Signed and sealed this 25th day of November 1969.

(SEAL)
Attest:

EDWARD M. FLETCHER, JR.                    WILLIAM E. SCHUYLER, JR.
Attesting Officer                                Commissioner of Patents